(12) United States Patent
Ryu et al.

(10) Patent No.: US 8,968,907 B2
(45) Date of Patent: Mar. 3, 2015

(54) BATTERY PACK

(75) Inventors: Jae-Uk Ryu, Yongin-si (KR); Jin-Tae Hong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 729 days.

(21) Appl. No.: 13/162,489

(22) Filed: Jun. 16, 2011

(65) Prior Publication Data

US 2012/0052334 A1 Mar. 1, 2012

Related U.S. Application Data

(60) Provisional application No. 61/378,348, filed on Aug. 30, 2010.

(51) Int. Cl.
*H01M 2/26* (2006.01)
*H01M 2/20* (2006.01)
*H01M 10/42* (2006.01)
*H01M 10/48* (2006.01)

(52) U.S. Cl.
CPC .............. *H01M 2/204* (2013.01); *H01M 2/20* (2013.01); *H01M 10/425* (2013.01); *H01M 10/482* (2013.01)
USPC ............... 429/121; 429/7; 429/100; 429/163; 429/185

(58) Field of Classification Search
CPC ......... H01M 2/34; H01M 2/105; H01M 2/30; H01M 2/08; H01M 10/02
USPC ............................. 429/7, 100, 121, 163, 185
See application file for complete search history.

(56) References Cited

U.S. PATENT DOCUMENTS

| | | | |
|---|---|---|---|
| 2008/0124617 A1 | 5/2008 | Bjork | |
| 2008/0311469 A1* | 12/2008 | Kim | 429/185 |
| 2009/0124099 A1 | 5/2009 | Chen | |
| 2009/0246615 A1 | 10/2009 | Park | |
| 2010/0136423 A1 | 6/2010 | Seo et al. | |
| 2011/0039130 A1 | 2/2011 | Baek et al. | |
| 2011/0039131 A1* | 2/2011 | Moon | 429/7 |

FOREIGN PATENT DOCUMENTS

| | | |
|---|---|---|
| CN | 101897056 A | 11/2010 |
| EP | 2 197 071 A1 | 6/2010 |
| JP | 61-158663 | 7/1986 |
| JP | 3-55653 | 5/1991 |
| JP | 08-017179 | 1/1996 |
| JP | 2003-068979 | 3/2003 |
| JP | 2007-237284 | 9/2007 |

(Continued)

OTHER PUBLICATIONS

Office Action dated Nov. 20, 2013 for corresponding CN Application No. 201110237978.6.

*Primary Examiner* — Patrick Ryan
*Assistant Examiner* — Alex Usyatinsky
(74) *Attorney, Agent, or Firm* — Knobbe Martens Olson & Bear LLP

(57) ABSTRACT

A battery pack comprises a battery cell; a protective circuit module, wherein the protective circuit module comprises an insertion hole; a terminal tab for coupling the battery cell with the protective circuit module, wherein a portion of the terminal tab is configured to be inserted into the insertion hole of the protective circuit module; and an insulating layer formed on a surface of the terminal tab such that a portion of the insulating layer is inserted into the insertion hole.

14 Claims, 7 Drawing Sheets

(56) References Cited

FOREIGN PATENT DOCUMENTS

| | | |
|---|---|---|
| JP | 2007-265855 | 10/2007 |
| JP | 2009-163932 | 7/2009 |
| JP | 2010-003466 | 1/2010 |
| JP | 2010-135303 | 6/2010 |
| JP | 2012-049105 | 3/2012 |
| KR | 10-2007-0033834 | 3/2007 |
| KR | 10 2007-0065560 | 6/2007 |
| KR | 10 2007-0068847 | 7/2007 |
| KR | 10-2009-0090546 | 8/2009 |
| KR | 10-2009-0097367 | 9/2009 |
| KR | 2009-0104584 A | 10/2009 |

* cited by examiner

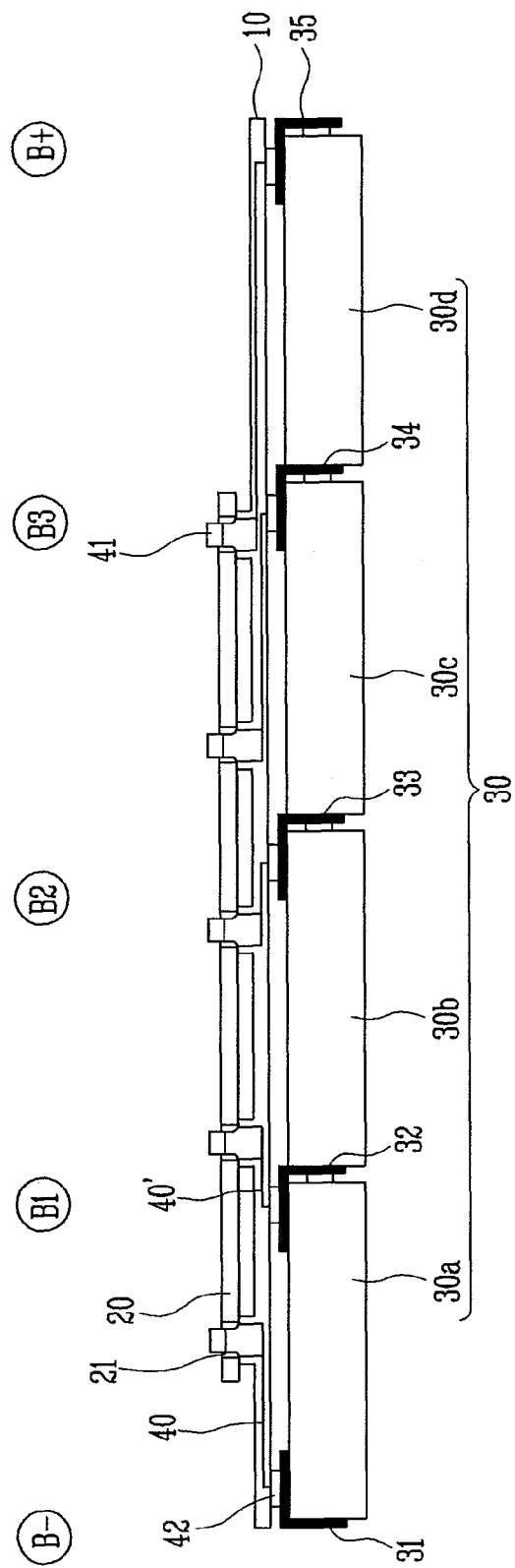

BATTERY PACK

RELATED APPLICATIONS

This application claims the benefit of U.S. Provisional Application No. 61/378,348, filed with the United States Patent and Trademark Office on Aug. 30, 2010, the entire contents of which are incorporated herein by reference.

BACKGROUND

1. Field

Embodiment of the invention relate to a battery pack, and more particularly, to a battery pack with improved reliability.

2. Description of the Related Technology

Power supply devices used in notebook computers and the like are formed by battery packs that include a plurality of battery cells connected in series and/or parallel to obtain a desired voltage and a desired capacity. The connection of the plurality of battery cells in series and/or parallel is typically achieved by welding the respective battery cells using connection tabs. A protective circuit module ("PCM") such as a charge/discharge control circuit or a protective circuit may be mounted on the battery cells. The PCM and the battery cells may be electrically connected using terminal tabs.

SUMMARY

Embodiments provide a battery pack in which a portion of an insulating member attached to an external surface of a terminal tab is inserted into an insertion hole of a PCM to prevent disconnection of the terminal tab in a position corresponding to the insertion hole.

According to an aspect of the present invention, a battery pack comprises: a battery cell; a protective circuit module, wherein the protective circuit module comprises an insertion hole; a terminal tab for coupling the battery cell with the protective circuit module, wherein a portion of the terminal tab is configured to be inserted into the insertion hole of the protective circuit module; and an insulating layer formed on a surface of the terminal tab such that a portion of the insulating layer is inserted into the insertion hole.

According to an aspect, the insulating layer is not exposed through an exterior side of the insertion hole when the portion of the terminal tab is inserted through the insertion hole.

According to an aspect, the insertion hole has a depth and the portion of the insulating layer inserted into the insertion hole has a length that ranges from about 50% to 80% of the depth of the insertion hole.

According to an aspect, the portion of the insulating layer inserted into the insertion hole has a length that ranges from about 60% to 80% of the depth of the insertion hole.

According to an aspect, the terminal tab is formed of a thin plate comprising a conductive material. According to an aspect, the terminal tab comprises copper. According to an aspect, the terminal tab is substantially covered by the insulating layer, except for at a first portion at one end of the terminal tab that is configured to be soldered to the protective circuit module, and at a second portion at an end that is opposite to the first portion.

According to an aspect, the insulating layer comprises polyimide.

According to an aspect, the terminal tab further comprises a stopper portion adjacent to the portion configured to be inserted into the insertion hole.

According to an aspect, the stopper portion and the portion configured to be inserted into the insertion hole share a boundary that is round.

According to an aspect, the portion of the terminal tab that is configured to be inserted into the insertion hole comprises a straight edge.

According to an aspect, the portion of the terminal tab that is configured to be inserted into the insertion hole comprises a round edge.

According to an aspect, the battery pack further comprises a plurality of battery cells; a plurality of insertion holes formed on the protective circuit module; a plurality of terminal tabs for coupling the battery cells with the protective circuit module, wherein the terminal tabs are configured to be inserted into the insertion holes; and an insulating layer formed on surfaces of each of the terminal tabs such that portions of the insulating layer on the terminal tabs are inserted into the insertion holes.

According to an aspect, the insulating layer formed on the surface of each of the terminal tabs is formed of a single insulating layer.

According to an aspect, the single insulating layer is configured to be placed on an external surface of the plurality of battery cells.

BRIEF DESCRIPTION OF THE DRAWINGS

The accompanying drawings, together with the specification, illustrate certain embodiments of the present invention, and, together with the description, serve to explain principles of the present invention.

FIG. 9 is a cross-sectional view taken along a line D-D' of FIG. 7.

DETAILED DESCRIPTION

Embodiments of the present invention are described hereafter in detail with the accompanying drawings for those skilled in the art to easily understand. However, embodiments of the present invention may be changed and modified in various ways within the scope described in claims; therefore, it can be understood by those skilled in the art that the description below only illustrate certain embodiments.

The configuration and operation of embodiments according to the present invention are described hereafter in detail with reference to the accompanying drawings.

Figure 1:
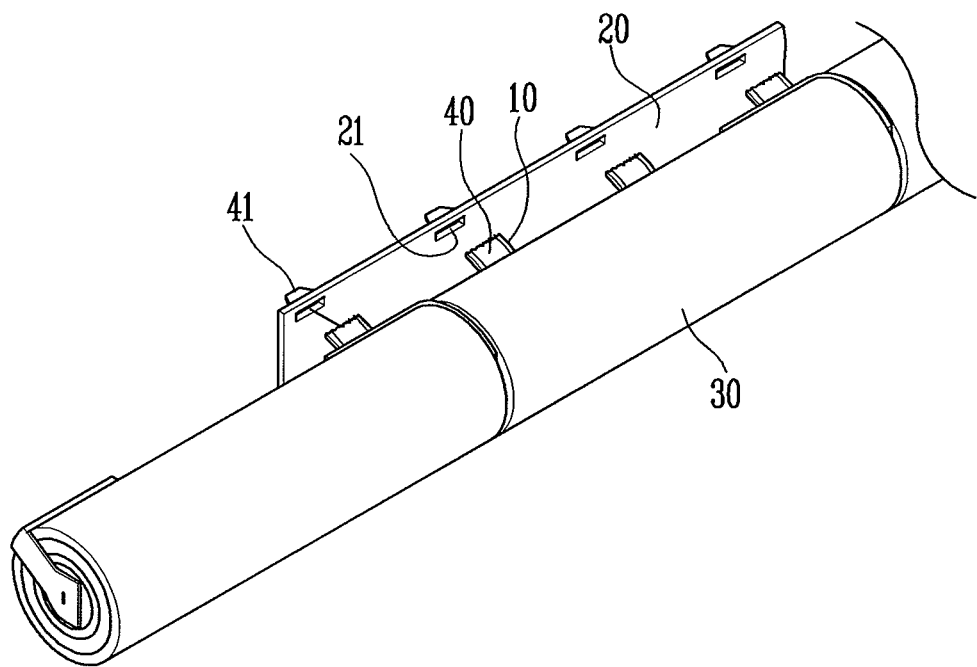
FIG. 1 is a perspective view illustrating a general battery pack in which a terminal tab is disconnected.

FIG. 1 is a perspective view illustrating a general battery pack in which a terminal tab is disconnected.

Referring to FIG. 1, a battery cell 30 may be electrically connected to a protective circuit module (PCM) 20 through a terminal tab 40. The terminal tab 40 may be inserted into an insertion hole 21 formed in the PCM 20, and the terminal tab 40 and the PCM 20 may be fixed by soldering on a side where the terminal tab 40 is drawn out.

The terminal tab 40 may include an insulating member 10 on an external surface. The insulating member 10 may be formed on a portion of the terminal tab 40 that is adjacent to the battery cell 30, but not formed in a portion corresponding to the insertion hole 21 and a portion that is drawn out to the insertion hole 21. The terminal tab 40 drawn out to the outside through the insertion hole 21 may be electrically connected to the PCM 20 by soldering.

Thus, an end portion of the terminal tab 40 inserted into the insertion hole 21 may be formed to be thinner than a portion of the terminal tab 40 that the insulating member 10 is attached to. Accordingly, when the terminal tab 40 is soldered to the PCM 20 and subjected to a reliability test such as a HALT test, the end portion of the terminal tab 40 to which the insulating member 10 is not attached can become disconnected.

Further, it is not easy to fix the PCM 20 and a solder part 41 when soldering, so that soldering efficiency is low.

Figure 2:
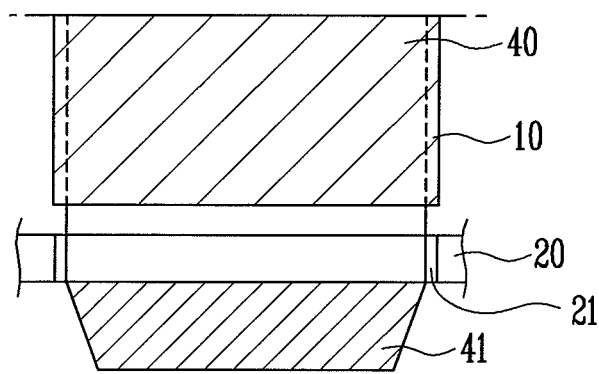
FIG. 2 is a cross-sectional view illustrating the insertion of the terminal tab of the general battery pack into a PCM.

FIG. 2 is a cross-sectional view illustrating the insertion of the terminal tab of the general battery pack into the PCM.

Referring to FIG. 2, where the terminal tab 40 is inserted into the insertion hole 21 of the PCM 20 and soldered, the insulating member 10 attached to the external surface of the terminal tab 40 is attached so that does not contact the PCM 20. That is, the insulating member 10 is not attached from a portion of the terminal tab 40 before the insertion hole 21 to the end portion of the terminal tab 40 on which a solder is formed.

The insulating member 10 is not attached to the end portion of the terminal tab 40 in order to form the solder part 41, and accordingly, the end portion of the terminal tab 40 is formed to be thinner than a portion of the terminal tab 40 that the insulating member 10 is attached to. Thus, a portion of the terminal tab 40 disposed to the insertion hole 21 in an insertion direction of the terminal tab 40 is vulnerable to impact, such as vibrations or a drop. That is, the terminal tab 40 can become disconnected by a collision to the PCM 20.

Here, the terminal tab 40 conventionally uses copper (Cu) for its structure, thickness it provides to a case and material costs. However, disconnection phenomenon occurs relatively frequently when using copper softer than nickel.

Figure 3:
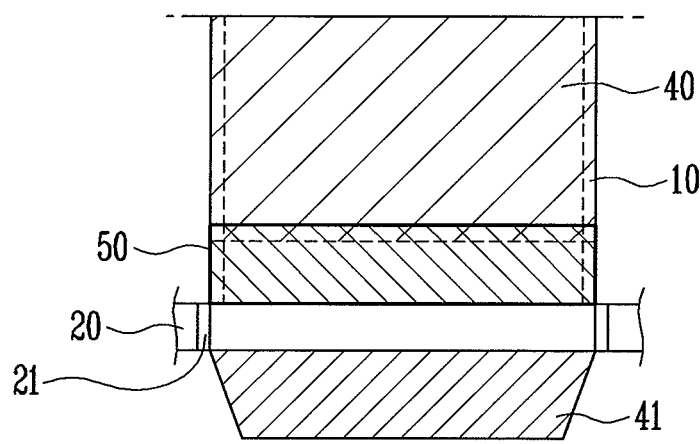
FIG. 3 is a cross-sectional view illustrating the application of silicon to a disconnected part in FIG. 2.

FIG. 3 is a cross-sectional view illustrating the application of silicon to a disconnected part in FIG. 2.

Referring to FIG. 3, in order to prevent disconnection in FIG. 2, silicon 50 may be applied to the portion of the terminal tab 40 that the insulating member 10 is not attached to before the insertion hole 21. The silicon 50 may partly overlap with the insulating member 10 and reinforce the thickness of the terminal tab 40, thereby minimizing formation of the disconnection in FIG. 2.

However, the application of silicon 50 leads to an increase in manufacturing processes and costs, and disconnection may still occur in a portion of the terminal tab 40 to which the silicon 50 is applied in the insertion hole 21. Thus, embodiments of the present invention have reinforcement to the disconnected part for a battery pack.

Figure 4:
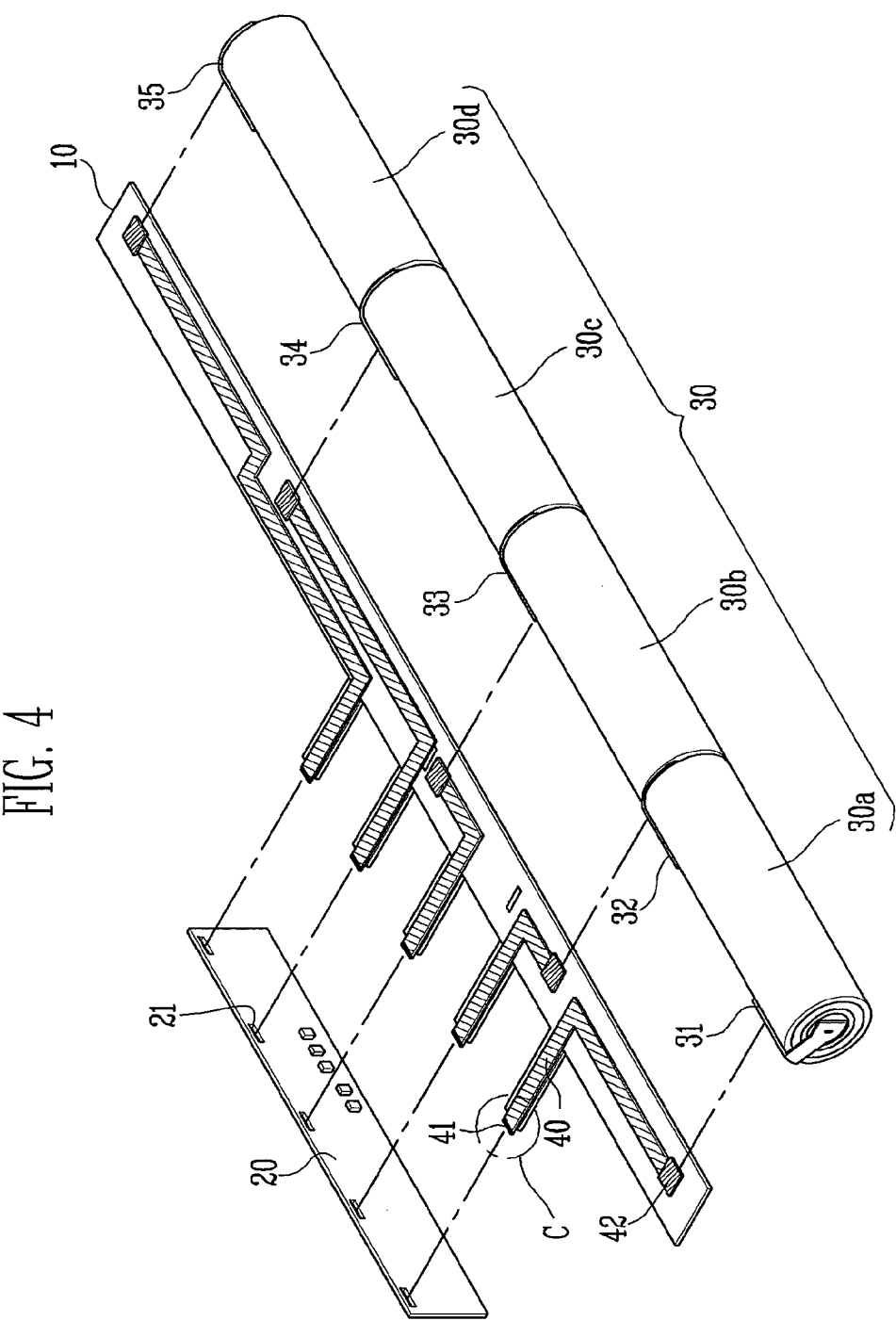
FIG. 4 is an exploded perspective view illustrating a battery pack according to an embodiment of the present invention.

FIG. 4 is an exploded perspective view illustrating a battery pack according to an embodiment of the present invention.

Referring to FIG. 4, the battery pack according to an embodiment includes a plurality of battery cells 30a, 30b, 30c, and 30d (hereinafter, collectively referred to as "30" except when description of the respective battery cells is necessary) and a PCM 20 formed on one side of the battery cells 30. Further, the battery pack may include a terminal tab 40 disposed between the battery cells 30 and the PCM 20 to electrically connect the battery cells 30 and the PCM 20. An insulating member 10 may be attached to an external surface of the terminal tab 40.

According to an embodiment, the PCM 20 is formed of a protective circuit board and electronic components mounted thereon. The PCM 20 may include the function of detecting overcharge or overdischarge of a battery to control an electric current. At least one insertion hole 21 into which an end portion of the terminal tab 40 is inserted may be formed in the protective circuit board.

The battery cells 30 may be formed of four battery cells 30a, 30b, 30c, and 30d connected in series. Here, connection tabs 32, 33, and 34 are disposed between the respective battery cells 30, and outermost connection tabs 31 and 35 are disposed on the outermost battery cells 30a and 30d. Accordingly, the battery cells 30 may be electrically connected by the connection tabs 32, 33, and 34 disposed therebetween. Furthermore, the outermost connection tabs 31 and 35 may be used as a high current terminal for the battery.

The terminal tab 40 electrically connecting the PCM 20 and the battery cells 30 may be formed as a thin and long plate and include a conductive material such as Cu. Moreover, except one end portion of the terminal tab 40 that is a solder part 41 and another end portion that is a terminal tab exposure part 42, the external surface of the terminal tab 40 may be covered by the insulating member 10. Thus, a plurality of terminal tabs 40 may be integrated by the insulating member 10, and the insulating member 10 may be formed in various shapes so that it is easily seated on an external surface of the battery cells 30. Here, the insulating member 10 may be formed of a polyimide (PI) film.

Although the entire terminal tabs 40 are shown to be exposed to the outside in FIG. 4, this is shown to clearly show the structure of the terminal tabs 40. As described above, the external surface of the terminal tabs 40 may be covered by the insulating member 10 except for the solder part 41 and the terminal tab exposure part 42. According to this embodiment, one end portion of the terminal tabs 40 may be formed with a stepped part 60 (refer to FIG. 5), which will be further described with reference to FIG. 5.

Figure 5:
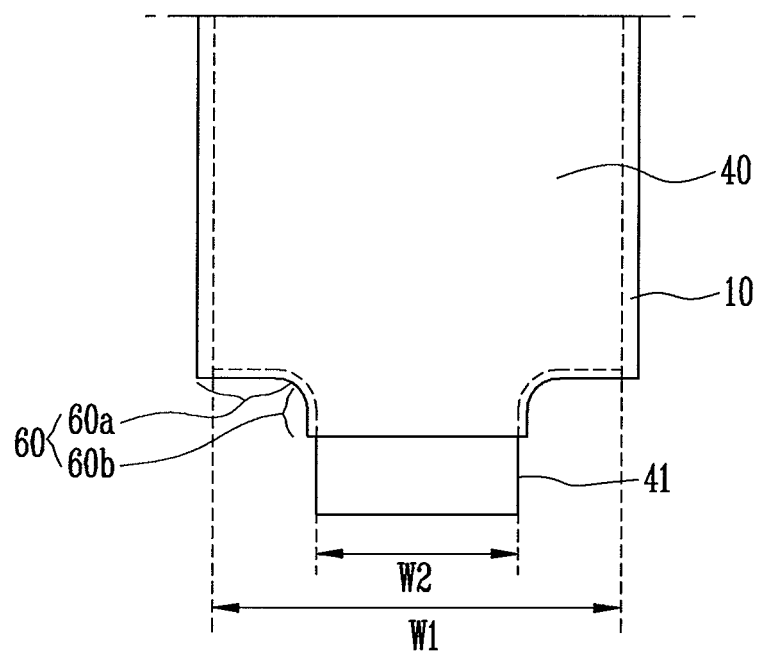
FIG. 5 is an enlarged cross-sectional view of a part C in FIG. 4 illustrating one end portion of a terminal tab according to the embodiment of the present embodiment.

FIG. 5 is an enlarged cross-sectional view of a part C in FIG. 4 illustrating one end portion of the terminal tabs according to an embodiment of the present invention.

Referring to FIG. 5, the stepped part 60 may be formed at an end portion of the terminal tabs 40 connected to the PCM 20. Accordingly, the insulating member 10 covering the terminal tabs 40 may be attached based on a shape of the stepped part 60. The stepped part 60 may be formed of a stopper part 60a and an insertion part 60b. The insertion part 60b may be formed on the end portion of the terminal tabs 40 and be a portion narrower in width than the stopper part 60a, and the stopper part 60a may be a portion extending from the insertion part 60b.

Here, the width W1 of the stopper part 60a may be formed to be wider than the width of the insertion hole 21 of the PCM 20 (refer to FIG. 4). Accordingly, when the terminal tabs 40 are inserted into the insertion holes 21, the insertion can be stopped by the stopper part 60a, so that the terminal tabs 40 and the PCM 20 may be combined in a proper position. The width W2 of the insertion part 60b may be formed to be narrower than the insertion hole 21, and thus only insertion part 60b is inserted into the insertion hole 21.

Here, the insulating member 10 may be formed from the stopper part 60a to a portion of the insertion part 60b, thereby reinforcing the thickness on a boundary between the stopper part 60a and the insertion part 60b. That is, the insulating member 10 may be formed to extend in an insertion direction of the terminal tabs 40 so that a portion of the insulating member 10 is inserted into the insertion hole 21.

The boundary between the stopper part 60a and the insertion part 60b may be formed to be round. Accordingly, even if an impact such as vibrations or a drop happens to the terminal tabs 40, the terminal tabs 40 are inhibited from colliding with the PCM 20 and breaking. Further, arrangement of the terminal tabs 40 in the insertion holes 21 may be facilitated.

Figure 6:
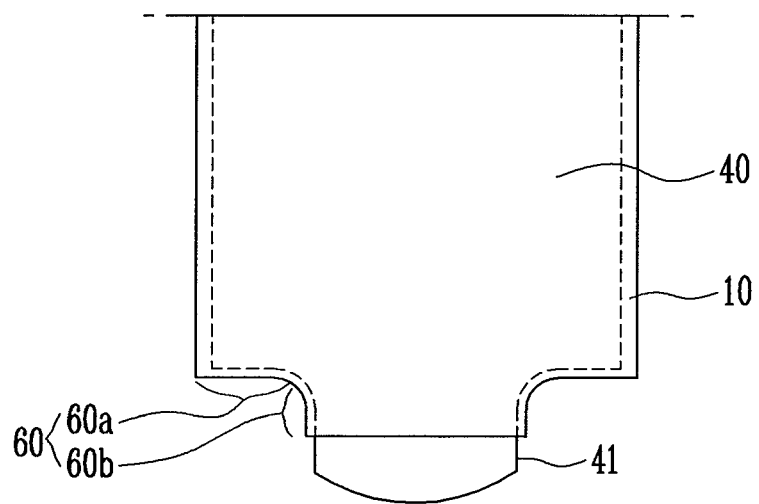
FIG. 6 is a cross-sectional view illustrating one end portion of a terminal tab having a different shape from that in FIG. 5.

FIG. 6 is a cross-sectional view illustrating one end portion of a terminal tab having a different shape from that of FIG. 5.

An insulating member 10, a terminal tab 40, and a stepped part 60 as shown in FIG. 6 are the same as or similar to those in the embodiment shown in FIG. 5, and thus repeated description will be omitted. In FIG. 6, an insertion part 60b of the stepped part 60 may have a round shape. Accordingly, when the terminal tab 40 is inserted into an insertion hole 21 (refer to FIG. 4), the terminal tab 40 may not cause damage to the insertion hole 21, and injury to a person by the insertion part 60b may also be prevented.

Figure 7:
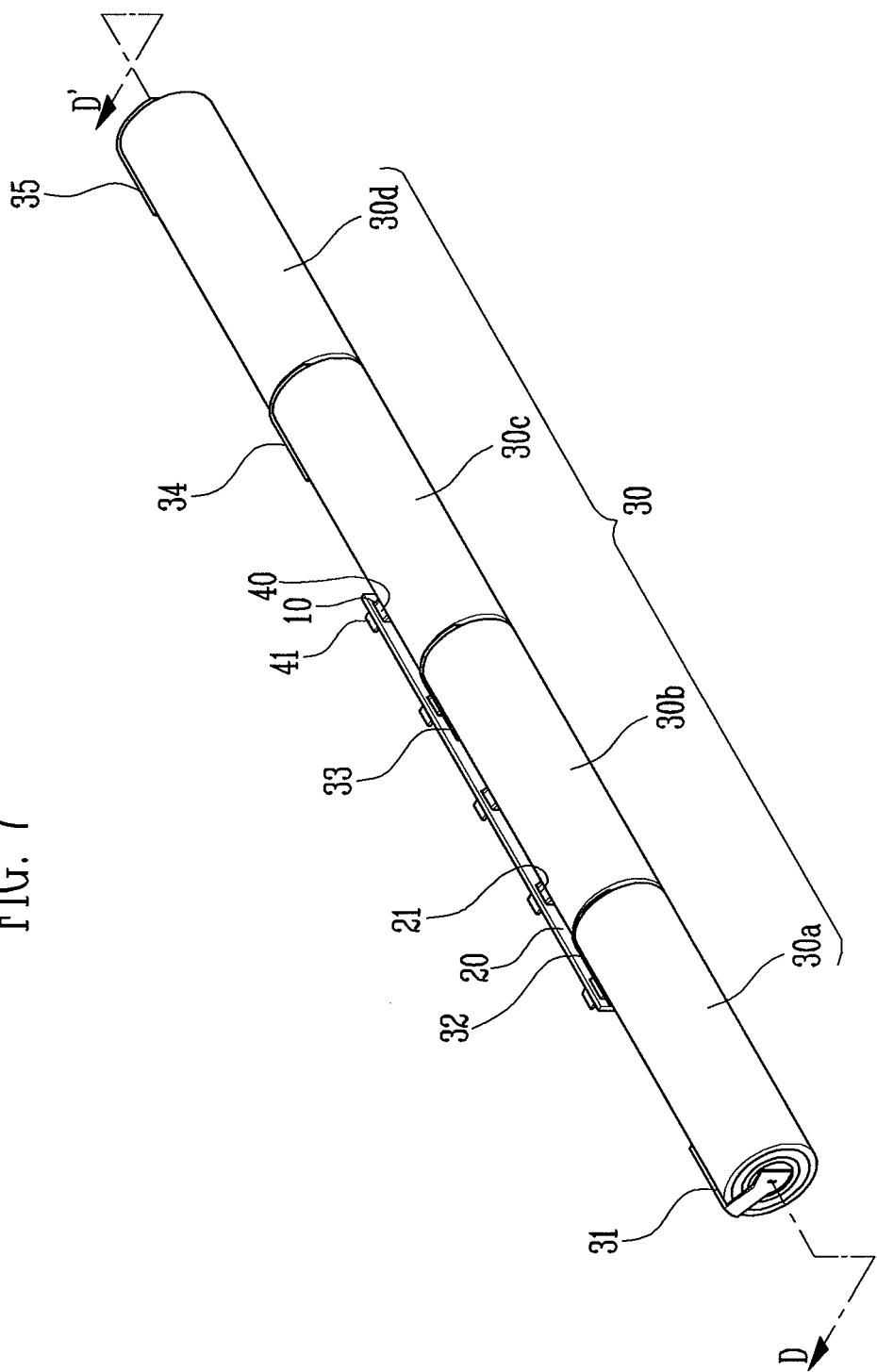
FIG. 7 is a perspective view illustrating the combined battery pack according to an embodiment of the present invention.

FIG. 7 is a perspective view illustrating the combined battery pack according to an embodiment of the present invention.

Referring to FIG. 7, the plurality of battery cells 30 may be connected by the connection tabs 32, 33, and 34, and may be electrically connected to the PCM 20 via the terminal tabs 40. Here, the insulating member 10 is attached to the external surface of the terminal tabs 40, except for the solder part 41 and the terminal tab exposure part 42 (refer to FIG. 4).

Accordingly, the solder part 41 on one side of the terminal tabs 41 may be inserted into the insertion holes 21 of the PCM 20 to be soldered to the PCM 20. The terminal tab exposure part 42 on another side of the terminal tabs 40 (refer to FIG. 8) may be soldered to the connection tabs 32, 33, and 34 and the outermost connection tabs 31 and 35.

Here, the insulating member 10 attached to one external surface of the terminal tabs 40 may be formed to extend in the insertion direction of the terminal tabs 40 so that a portion of the insulating member 10 is inserted into the insertion holes 21. That is, the insulating member 10 may be formed so that it is not exposed outside the insertion holes 21 of the PCM 20 to which the terminal tabs 40 are drawn out. Accordingly, not only is the solder part 41 secured to solder the terminal tabs 40 and the PCM 20, but the thickness of up to a portion of the terminal tabs 40 inserted into the insertion holes 21 may be reinforced by the insulating member 10. Thus, disconnection of the terminal tabs 40 by impact such as vibrations or a drop may be inhibited.

Figure 8:
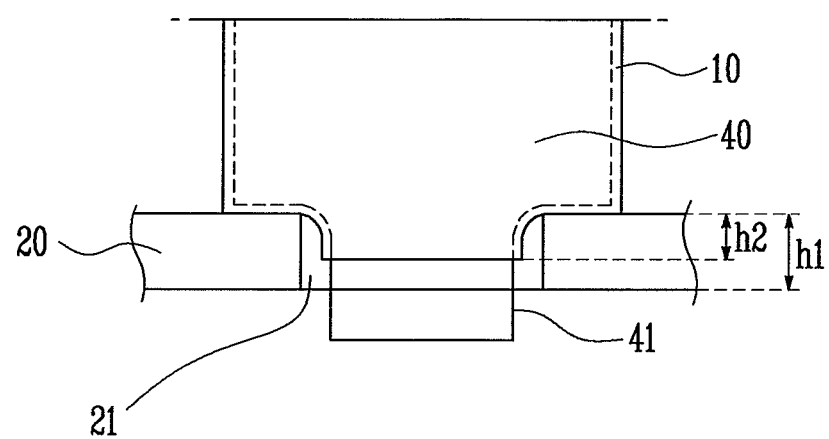
FIG. 8 is a cross-sectional view illustrating that the terminal tabs are inserted into a PCM according to an embodiment of the present invention.

FIG. 8 is a cross-sectional view illustrating that the terminal tabs are inserted into the PCM according to an embodiment of the present invention.

Referring to FIG. 8, the terminal tabs 40 may be inserted into the insertion holes 21 of the PCM 20 to be soldered to the PCM 20 on a side where the terminal tabs 40 are drawn out. Here, the insulating member 10 attached to the external surface of the terminal tabs 40 may be formed to extend in the insertion direction of the terminal tabs 40 so that a portion of the insulating member 10 is inserted into the insertion holes 21. Here, an end portion of the terminal tab 40 to which the insulating member 10 is not attached is the solder part 41.

The length h2 of the portion of the insulating member 10 inserted into the insertion holes 21 may be 50% to 80% of the depth h1 of the insertion holes 21. Preferably, the length h2 of the portion of the insulating member 10 inserted into the insertion holes 21 may be 60% to 80% of the depth h1 of the insertion holes 21.

When the length h2 of the insulating member 10 is less than 50% of the depth h1 of the insertion holes 21, the insulating member 10 may not be positioned in an entrance side of the insertion holes 21 when a worker inserts the terminal tabs 40 into the insertion holes 21. Accordingly, disconnection of the terminal tabs 40 can occur. Further, when the length h2 of the insulating member 10 is more than 80% of the depth h1 of the insertion holes 21, the solder part 41 may decrease in area and cause a soldering defect.

FIG. 9 is a cross-sectional view taken along a line D-D' of FIG. 7.

Referring to FIG. 9, the outermost connection tab 31 may be welded to the left side of the battery cell 30a, and the connection tab 32 may be welded to the battery cell 30a and the battery cell 30b. Further, the connection tab 33 may be welded to the battery cell 30b and the battery cell 30c, and the connection tab 34 may be welded to the battery cell 30c and the battery cell 30d. In addition, the outermost connection tab 35 may be welded to the right side of the battery cell 30d. Here, opposite sides of the battery cells 30 can have different polarities, wherein the right side of the battery cells 30 in a protruding terminal shape (not shown) denotes a positive pole, and an opposite flat left side denotes a negative pole.

Here, it should be noted that the left side and the right side of the battery cell 30a is not to limit the present invention but just to denote a left side and a right side shown in the drawing.

In FIG. 9, B+ and B− represent a high current terminal and denote power supply units at opposite terminals of the battery cells connected in series. B+ is a positive power supply unit and represents a highest potential terminal, and B− is a negative power supply unit and represents a lowest potential terminal. The terminal tabs 40 that are power supply wires to draw out power may be connected to the high current terminals B+ and B−. The terminal tabs 40 are for drawing out power and are distinguished from the sensing terminal tab 40', which will be described later.

B1, B2, and B3 represent sensing terminals and indicate portions in which battery cells with different polarities are connected in series. The sensing terminals B1, B2, and B3 may be connected with the sensing terminal tab 40' which is a sensing wire to detect a voltage.

In the electrically connected structure, the terminal tabs 40 that are the power supply wires soldered to the outermost connection tab 31 of the high current terminal B− are connected to the PCM 20 along a surface of the battery cells 30 connected in series. The terminal tabs 40 that are the power supply wires soldered to the outermost connection tab 35 of the high current terminal B+ are connected to the PCM 20. Accordingly, the battery cells 30 are the PCM 20 are electrically connected.

Here, in a state in which the terminal tabs 40 for drawing out power and the sensing terminal tab 40' are respectively soldered to the PCM 20, a portion of the insulating member 10 is attached to an external surface of the terminal tabs 40 inserted into the insertion holes 21 and the sensing terminal tab 40'. Accordingly, disconnection of the terminal tabs 40 and the sensing terminal tab 40' in a position corresponding to the insertion holes 21 may be inhibited.

A real cross-sectional view of the terminal tabs 40 and the sensing terminal tab 40' is different from that shown in FIG. 9. FIG. 9 is intended to show the connection of the terminal tabs 40 and the sensing terminal tab 40' to the PCM 20 and the battery cells 30.

In the aforementioned embodiment, the battery pack with a 4-series (4S) structure is described as an illustrative example, but the embodiment may also be applicable to various battery packs in series and/or in parallel.

Although the spirit of the present invention was described in detail in accordance with certain embodiment, it should be understood that the embodiments are described to explain certain aspects of the present invention and do not limit the present invention. It should be understood that the present invention may be changed and modified in various ways by those skilled in the art, without departing from the scope of the present invention.

While the present invention has been described in connection with certain embodiments, it is to be understood that the invention is not limited to the disclosed embodiments, but on the contrary, is intended to cover various modifications and equivalent arrangements included within the spirit and scope of the appended claims.

What is claimed is:

1. A battery pack comprising:
   a battery cell;
   a protective circuit module, wherein the protective circuit module comprises an insertion hole;
   a terminal tab for coupling the battery cell with the protective circuit module, wherein a portion of the terminal tab is configured to be inserted into the insertion hole of the protective circuit module; and
   an insulating layer formed on a surface of the terminal tab so as to be positioned thereon such that a portion of the insulating layer is inserted into the insertion hole and wherein an uninsulated portion of the terminal tab extends through the insertion hole and is soldered to the protective circuit module and wherein the insertion hole has a depth and the portion of the insulating layer inserted into the insertion hole has a length that ranges from about 50% to 80% of the depth of the insertion hole.

2. The battery pack of claim 1, wherein the insulating layer is not exposed through an exterior side of the insertion hole when the portion of the terminal tab is inserted through the insertion hole.

3. The battery pack of claim 1, wherein the portion of the insulating layer inserted into the insertion hole has a length that ranges from about 60% to 80% of the depth of the insertion hole.

4. The battery pack of claim 1, wherein the terminal tab is formed of a thin plate comprising a conductive material.

5. The battery pack of claim 1, wherein the terminal tab comprises copper.

6. The battery pack of claim 1, wherein the terminal tab is covered by the insulating layer, except for at a first portion at one end of the terminal tab that is configured to be soldered to the protective circuit module, and at a second portion at an end that is opposite to the first portion.

7. The battery pack of claim 1, wherein the insulating layer comprises polyimide.

8. The battery pack of claim 1, wherein the terminal tab further comprises a stopper portion adjacent to the portion configured to be inserted into the insertion hole.

9. The battery pack of claim 8, wherein the stopper portion and the portion configured to be inserted into the insertion hole share a boundary that is round.

10. The battery pack of claim 1, wherein the portion of the terminal tab that is configured to be inserted into the insertion hole comprises a straight edge.

11. The battery pack of claim 1, wherein the portion of the terminal tab that is configured to be inserted into the insertion hole comprises a round edge.

12. The battery pack of claim 1, further comprising:
   a plurality of battery cells;
   a plurality of insertion holes formed on the protective circuit module;
   a plurality of terminal tabs for coupling the battery cells with the protective circuit module, wherein the terminal tabs are configured to be inserted into the insertion holes; and
   an insulating layer formed on surfaces of each of the terminal tabs such that portions of the insulating layer on the terminal tabs are inserted into the insertion holes.

13. The battery pack of claim 12, wherein the insulating layer formed on the surface of each of the terminal tabs is formed of a single insulating layer.

14. The battery pack of claim 13, wherein the single insulating layer is configured to be placed on an external surface of the plurality of battery cells.

* * * * *